May 28, 1957
R. K. GARRITY
2,793,705
INSECT AND DEBRIS DEFLECTOR FOR MOTOR
VEHICLE HOOD FRONT SURFACE
Filed Oct. 11, 1955
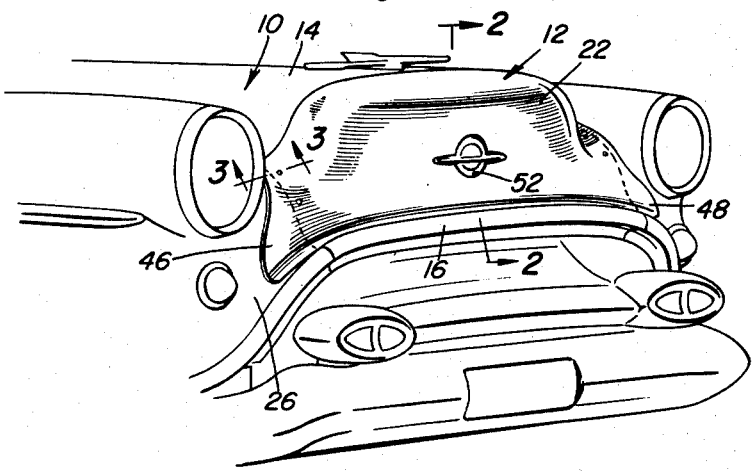
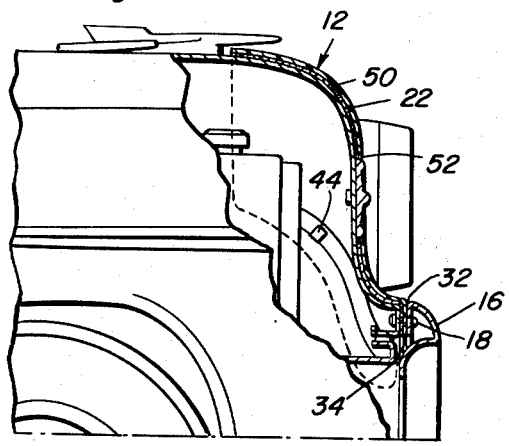
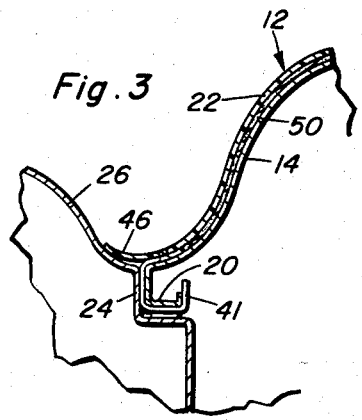
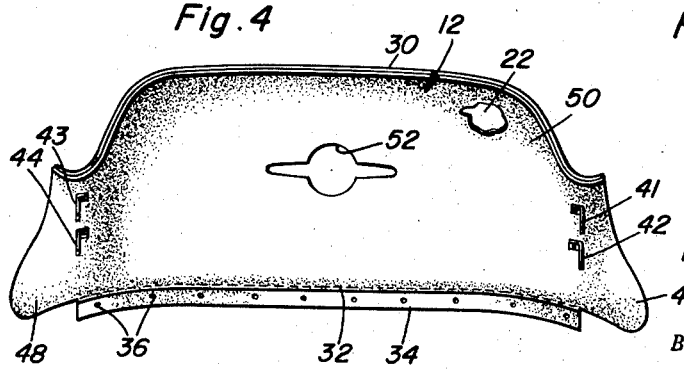
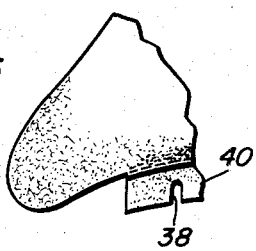
Robert K. Garrity
INVENTOR.
BY *Clarence A. O'Brien*
*and Harvey B. Jacobson*
Attorneys

United States Patent Office 2,793,705
Patented May 28, 1957

2,793,705

INSECT AND DEBRIS DEFLECTOR FOR MOTOR VEHICLE HOOD FRONT SURFACE

Robert K. Garrity, Omaha, Nebr.

Application October 11, 1955, Serial No. 539,738

2 Claims. (Cl. 180—69)

This application is a continuation-in-part of my copending application Serial Number 517,451 which was filed on June 23, 1955, and is now abandoned.

The invention relates to attachments for motor vehicles and particularly to an insect and debris deflector which is adapted to be mounted on the front of the vehicle.

There are presently available screens which are specifically designed to be placed over and attached in front of the grills of motor vehicles. Such screens prevent a considerable percentage of insects and debris from entering the grill and radiator of the motor vehicle. In addition, deflectors which are mounted directly upon the hood ornament or behind it or in front of it are designed to prevent insects from impinging upon the windshield of the vehicle. An object of this invention is to provide a debris and insect deflector which is adapted to be mounted on the front of the vehicle hood in order to protect it against becoming marked and damaged by debris normally encountered in ordinary vehicle operation. Such debris after a short time causes the painted motor vehicle front to become marked and even dented. In contrast to the available screens and deflectors for the protection of the vehicle windshield, the present invention provides a deflector shaped to conform to the curvatures of the front of the vehicle, fitting snugly thereon and preferably being of a color to match the finish of the vehicle.

A further object of the invention is to provide an insect and debris deflector adapted to conform to the curvature and outline of the front of the motor vehicle, the deflector fitting between the lower edge of the hood and the top surface of the hood and retained along the lower edge of the hood and secured to the side edges of the hood by improved clamps that are malleable in order to have an exact fit regardless of the small deviations in size and shape which may be experienced in the same make and model of a manufacturer's vehicle.

Another object of the invention is to provide an inexpensive deflector for debris and insects which is specifically designed to protect the front finish of the vehicle, the deflector being confined to the frontal space of the vehicle between the grill and the top surface of the hood, whereby the deflector does not impede the free and complete vision of the vehicle occupants and whereby the deflector does not impede air flow through the grill.

A still further object of the invention is to provide a deflector for debris, the deflector being attachable to the front surface of the hood of the vehicle and being of such shape that it conforms to the hills and valleys and other curvatures in the front of the vehicle, the deflector having lateral extensions which protrude beyond the side edges of the hood in order to overlie the front part of the fenders adjacent to the headlights of the vehicle thereby affording protection for this portion of the finish of the vehicle.

Another object of the invention is to provide a deflector for the front part of a motor vehicle, the deflector being form fitted to the contours of the front of the vehicle and preferably of a thin sheet of plastic material having one or more apertures in it through which the manufacturer's insignia may be observed, the deflector being flocked on one surface in order to form a cushion for the protection of the vehicle finish between the thin, sheet-like panel and the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a motor vehicle fitted with an insect and debris deflector in accordance with the invention;

Figure 2 is a fragmentary sectional view taken generally on the plane of line 2—2 of Figure 1;

Figure 3 is an enlarged fragmentary sectional view taken substantially on the plane of line 3—3 of Figure 1 and in the direction of the arrows;

Figure 4 is an elevational rear view of the deflector fitted on the motor vehicle of Figure 1; and Figure 5 is a fragmentary elevational view of the deflector in Figure 4 illustrating a modification of the means of attaching the lower edge thereof to the vehicle hood.

In the drawing the front part of a motor vehicle 10 is illustrated, this motor vehicle being an Oldsmobile. It is intended that the debris and bug deflector 12 be molded or otherwise made of a shape which has contours substantially identical to those of the front part of the motor vehicle, in the illustrated instance the Oldsmobile. When other manufacturers' makes of motor vehicles are involved the contours of the deflector are made to conform thereto.

The motor vehicle 10 has a hood 14 along the lower front edge of which there is a molding 16 held in place by wire clips 18, bolts or other standard fasteners. The side edges of hood 14 have substantially L-shaped flanges 20 which seat and fit on the side edges 24 of the fenders 26.

Deflector 12 comprises a panel 22 of plastic material, although other materials may be substituted, this panel being shaped to conform to the contour of the front part of the vehicle. This is particularly true of the front surface of hood 14 the substantial entirety of which is covered by the panel 22. The upper edge 30 of the panel terminates in advance of the hood ornament and does not protrude above the ornament inasmuch as to do so would interfere with the vision of the occupants of the motor vehicle. The lower edge 32 of the panel has a downturned strip 34 integrally connected therewith and projecting downwardly (when installed on the vehicle) in order to fit between the molding 16 and the lower edge of the hood 14. Strip 34 constitutes a part of the means for fastening the deflector 12 on the motor vehicle. The remainder of these means comprise a series of apertures as at 36 through which the fasteners 18 pass in securing the deflector 12 to the vehicle. As shown in Figure 5 the apertures may be slots 38 which open through the strip 40. In Figure 4 it is seen that the apertures may be holes which pass directly through the strip 34. In either case the fasteners 18 are passed through them when the strip 34 or the strip 40 is fitted between the molding 16 and the lower edge of the hood 14.

Other means for fastening the deflector in place on the vehicle are attached to the rear surface of the panel. They are a plurality of easily bendable or malleable metal clips 41, 42, 43 and 44 riveted or otherwise rigidly fixed to the panel. Each clip is substantially right angular in shape and after the deflector is placed against the front of the vehicle hood 10, the clip is bent rearwardly around the flange 20, clinching the deflector 12 on the motor vehicle.

Extensions 46 and 48 project laterally from the side edges of the hood 14. Not only is the panel generally shaped to conform to all of the curvatures of the front surface of the hood 12, but the extensions 46 and 48 are also smoothly contoured (Figure 3) to fit over parts of the frontal surfaces of the two front fenders of the motor vehicle. Inasmuch as the fasteners 41, 42, 43 and 44 together with the fastening strip 34 or the fastening strip 40 are all attached to the hood 14, upon raising the hood the deflector 12 will be elevated with it and no difficulties are encountered in so doing.

It is preferred that the panel which forms the deflector be provided with cushioning means on the back surface thereof in order to protect the finish of the motor vehicle. The cushioning means may be in the form of resilient pads, a resilient panel or the entire back surface or parts of the back surface may be flocked as at 50. Although the purchaser may select any color or hue available, it is intended that a large selection of colors be made vailable so that the motor vehicle owner may select a deflector to match his automobile, truck or other vehicle. Inasmuch as there will be different shapes of deflectors for the various manufacturers' makes of vehicles, it is plausible to form apertures as at 52 in the deflectors in order that the manufacturers' insigina or other indicia may be visible.

In use the deflector 12 is applied to the motor vehicle as described previously. In use of the vehicle insects and particularly debris which normally impinge directly upon the finish of the motor vehicle at the front thereof, strike the deflector thereby protecting the finish of the motor vehicle in the front thereof. The deflector is made of such material that it is easily washable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a motor vehicle hood having a front curved surface and flanges along its side edges together with a molding along its lower front edge above a radiator grill, an insect and debris deflector to protect the finish of said front surface, said deflector comprising a panel which is curved to fit over and conform to the curvature of said front curved surface of said hood and arranged to be invisible to the motorist, fastening devices carried by said panel and engaging said flanges at the side edges of said hood, means at the lower edge of said panel interposed between said molding and the lower portion of said hood behind said molding for securing the lower edge of said panel to said hood, extensions which project laterally from the side edges of the hood and cover a portion of the motor vehicle adjacent to each side of the front surface of the hood, at least some of said fastening devices disposed at the inner parts of said extensions and comprising bendable clips which have portions adapted to be bent around the flanges of said hood.

2. The insect and debris deflector of claim 1 together with means between said panel and the front surface of said hood for cushioning said panel.

References Cited in the file of this patent

UNITED STATES PATENTS

| | | |
|---|---|---|
| 1,392,889 | Day | Oct. 4, 1921 |
| 1,584,518 | Drake | May 11, 1926 |
| 1,706,447 | Goodykoontz | Mar. 26, 1929 |
| 1,841,675 | Rood | Jan. 19, 1932 |
| 2,034,342 | Hay | Mar. 17, 1936 |
| 2,525,595 | Fergueson | Oct. 10, 1950 |
| 2,638,376 | Berry | May 12, 1953 |

FOREIGN PATENTS

| | | |
|---|---|---|
| 458,060 | Great Britain | Dec. 11, 1936 |